UNITED STATES PATENT OFFICE.

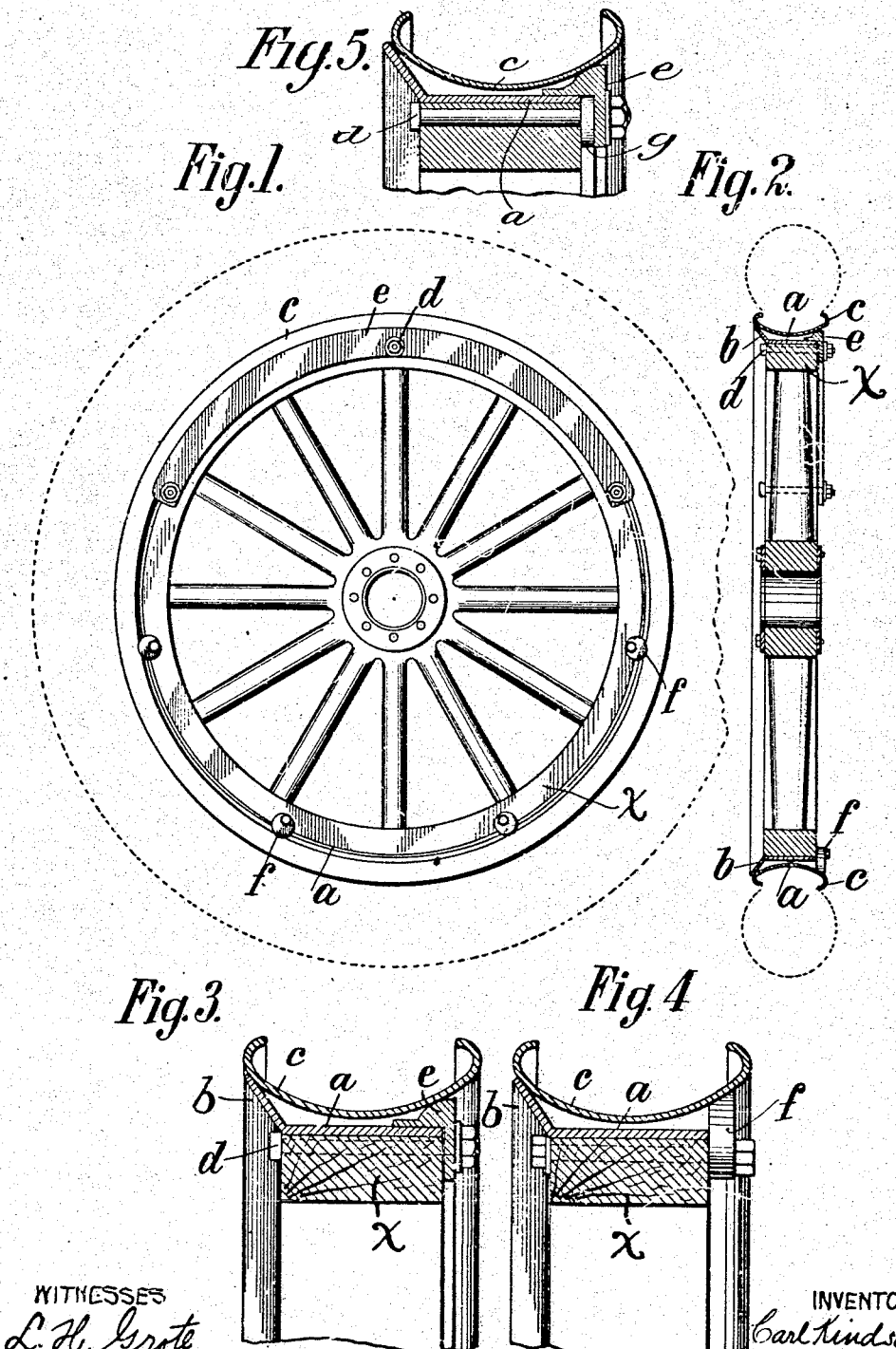

CARL KINDSCHERF, OF HANOVER, GERMANY, ASSIGNOR TO THE FIRM OF CONTINENTAL CAOUTCHOUC- & GUTTA-PERCHA CAMPAGNIE, OF HANOVER, GERMANY.

WHEEL FOR VEHICLES.

971,384.  Specification of Letters Patent.  Patented Sept. 27, 1910.

Application filed February 16, 1909.  Serial No. 478,314.

*To all whom it may concern:*

Be it known that I, CARL KINDSCHERF, a subject of the Grand Duke of Baden, residing at 1 Göbenstrasse, Hanover, Germany, have invented certain new and useful Improvements in Wheels for Vehicles; and I do hereby declare the following to be a full, clear, and exact description of the invention.

This invention relates to a vehicle wheel especially suitable for automobiles, comprising a removable rim which is secured to the main or fixed rim by rotary cams. In wheels of this kind as heretofore usually constructed the cams are distributed uniformly around the periphery of the wheel. The disadvantages of this arrangement are that to take off the removable rim it is necessary, in most cases, to actuate all the cams. Furthermore when the flange of the fixed rim which serves as an abutment for the removable rim is forced outwardly by prolonged running, that is flattened toward the wheel hub, the cams no longer bear sufficiently upon the removable rim to securely hold it fast upon the fixed rim. According to the present invention these disadvantages are avoided by attaching to the fixed rim an axially adjustable tension or abutment piece which embraces about one third of the wheel periphery and is formed with an inwardly directed wedge face, and which, when the removable rim is put on and taken off is not moved, and when the cams distributed over the remaining portion of the periphery are tightened up, effects the centering of the tire. When, after prolonged use of the wheel the flange of the fixed rim which serves as an abutment for the removable rim, becomes to some extent flattened so that the removable rim has to be pushed farther inwardly in an axial direction in order to bear against the said abutment flange, the tension piece is correspondingly adjusted axially and the removable rim thereby so shifted eccentrically with respect to the fixed rim or felly, that the cams opposite this tension piece again engage sufficiently with the suitably shaped edge of the removable rim as to insure secure attachment of the removable rim to the fixed rim. The slight eccentric displacement and any oblique setting of the removable rim relatively to the fixed rim or felly which may be occasioned thereby is rendered unnoticeable by the pneumatic tire.

Figure 1 of the accompanying illustrative drawings shows a constructional form of the improved wheel in side elevation; Fig. 2 is a central vertical transverse section of such wheel; Fig. 3 is a transverse section of the wheel and the tension piece on an enlarged scale; Fig. 4 is a view of the cam or eccentric on an enlarged scale; and Fig. 5 is a view similar to Fig. 3 showing the tension piece before it has been adjusted to recompense the flattening out of the flanges of the fixed rims.

On one side of an ordinary fixed rim $a$, which is attached to the felly $x$ of the wheel in the usual way, is formed an outwardly inclined flange $b$ which serves as an abutment for the removable rim $c$.

Attached to the felly $x$ by means of bolts $d$ so as to be adjustable in an axial direction, I provide a tension or abutment piece $e$ which is formed with an inwardly directed wedge face and embraces about one third of the periphery of the wheel. Around the remaining portion of the periphery are distributed rotary cams $f$, the beveled faces of which bear against the outer edge of the removable rim and can be tightened up in a well known way by means of a key. When the removable rim carrying the pneumatic tire is to be exchanged for another one, the cams $f$ are partially rotated to release the removable rim after which the portion held by the cams $f$ is swung outward and the rim may then be lifted off in a radial direction from the middle of the tension piece in a well known manner. The adjustment of a new rim can then be effected in reverse manner. In this way one pneumatic tire can be readily exchanged for another in exceedingly small time. When after prolonged use of a wheel the flange $b$ of the fixed rim becomes somewhat forced back or flattened so that the cams no longer grip the removable rim as firmly as formerly the tension piece $e$ is adjusted in an axial direction inwardly by the removal of the washer $g$ which is interposed between the inner face of the securing flange through which the bolt $d$ passes and the outer face of the felly, or a washer of less thickness is substituted therefor and the bolt then tightened. The wedge face of the tension piece is thereby caused to press the removable rim slightly outwardly whereby that part of the rim lying diametrically opposite to the tension piece is correspondingly brought nearer to the fixed rim so that the cams can again bear sufficiently upon the outer edge portion of the removable rim to enable it to be firmly held. The eccentric position of the removable rim, and any oblique position it may have relatively to the fixed rim, resulting from the adjustment of the tension piece do not, taking into consideration the comparatively large diameter of the pneumatic tire, have any injurious action, as experience with large automobiles has shown.

I am aware that it is not novel to provide means for removing the detachable rim without freeing the fastening devices around the entire periphery of the wheel and I do not claim this feature of my structure, nor the use of wedge pieces and eccentrics *per se*.

I claim as my invention:

In a vehicle wheel the combination of a removable rim having inclined outer edges with a fixed rim having an outwardly inclined flange, an axially adjustable tension piece having an inwardly directed wedge face extending over a portion of the periphery of the wheel and adapted to bear against said removable rim, screw bolts for adjusting the tension piece and rotary cams arranged around the balance of the periphery of the wheel and adapted to bear against the removable rim.

In testimony whereof I have signed my name to this specification, in the presence of two subscribing witnesses.

CARL KINDSCHERF.

Witnesses:
 OTTO IHLAN,
 FRANZ SUTORIUS.